United States Patent [19]
Sood

[11] Patent Number: 5,210,842
[45] Date of Patent: May 11, 1993

[54] DATA PROCESSOR HAVING INSTRUCTION VARIED SET ASSOCIATIVE CACHE BOUNDARY ACCESSING

[75] Inventor: Lal C. Sood, Austin, Tex.

[73] Assignee: Motorola, Inc., Schaumburg, Ill.

[21] Appl. No.: 650,108

[22] Filed: Feb. 4, 1991

[51] Int. Cl.⁵ .................. G06F 12/08; G06F 12/04; G11C 7/00
[52] U.S. Cl. .................. 395/425; 364/DIG. 1; 364/243.6; 364/964.2; 365/49
[58] Field of Search .................. 395/425, 400; 364/200 MS File, 243, DIG. 1, 964.2, 243.41, 243.6; 365/49

[56] References Cited
U.S. PATENT DOCUMENTS

| | | | |
|---|---|---|---|
| 4,575,792 | 3/1986 | Keeley | 395/425 X |
| 4,833,642 | 5/1989 | Ooi | 365/49 |
| 4,905,141 | 2/1990 | Brenza | 364/200 |
| 4,942,520 | 7/1990 | Langendorf | 395/425 |
| 4,945,512 | 7/1990 | Dekarske et al. | 365/230.06 |
| 5,014,195 | 5/1991 | Farrell et al. | 364/200 |
| 5,091,851 | 2/1992 | Shelton et al. | 395/425 |

Primary Examiner—Alyssa H. Bowler
Attorney, Agent, or Firm—Robert L. King

[57] ABSTRACT

A data processor having an instruction varied set associative cache boundary access capability provides reduced power consumption and maintains data processor performance. Queued data processor operation codes are partially decoded within an intermediate stage of an instruction pipe of the data processor to provide information on pending instructions. The information provided determines if a pending instruction will require either a full or a partial output line of information from the set associative cache. When the provided information from the instruction pipe indicates that an instruction will require a full output line of information to complete execution, the set associative cache provides the full output line of information. Otherwise, the set associative cache provides only a partial output line of information.

5 Claims, 2 Drawing Sheets

DATA PROCESSOR HAVING INSTRUCTION VARIED SET ASSOCIATIVE CACHE BOUNDARY ACCESSING

FIELD OF THE INVENTION

This invention relates generally to data processing systems, and more particularly, to a data processing system with an on-chip set associative cache.

BACKGROUND OF THE INVENTION

An on-chip set associative cache is a local memory storage device for a data processor. The on-chip set associative cache contains a duplicate copy of frequently utilized instructions and data for the data processor. A cache allows the data processor to minimize instruction and data accesses to external memory which require additional time, thereby obtaining an increase in data processing performance. An aspect of the on-chip set associative cache that provides an increase in data processing performance is the output line bit length of the on-chip set associative cache. That is, a relatively longer line bit length provides more instruction and data information for the data processor to access. A problem common to on-chip set associative caches, and in particular, to an on-chip set associative cache with a relatively long output line bit length, is excessive power consumption. Known methods of reducing the power consumption of the on-chip set associative cache include, but are not limited to, reducing the number of associated sets, and limiting the output line length for the on-chip set associative cache. However, both of the above mentioned solutions to reducing power have a common disadvantage of degrading performance of the data processing system with an on-chip set associative cache.

SUMMARY OF THE INVENTION

The previously mentioned needs are fulfilled with the present invention. In one form, a data processor having an instruction varied set associative cache boundary accessing is comprised of an instruction processing and decoding means for receiving a plurality of successive instructions and decoding the successive instructions. The instruction decoding means provides a set associative cache boundary control signal for a subsequent set associative cache access. A set associative cache control means has an input coupled to the instruction processing and decoding means for receiving the set associative cache boundary control signal and provides an encoded enable signal. A set associative cache is coupled to the set associative cache control means for receiving the encoded enable signal and has a predetermined number of lines of information of predetermined bit length. Said set associative cache utilizes the encoded enable signal to dynamically select one of a plurality of predetermined lengths of a line of information to be accessed in the set associative cache and is provided by the set associative cache.

These and other features, and advantages, will be more clearly understood from the following detailed description taken in conjunction with the accompanying drawings.

DESCRIPTION OF A PREFERRED EMBODIMENT

Figure 1:
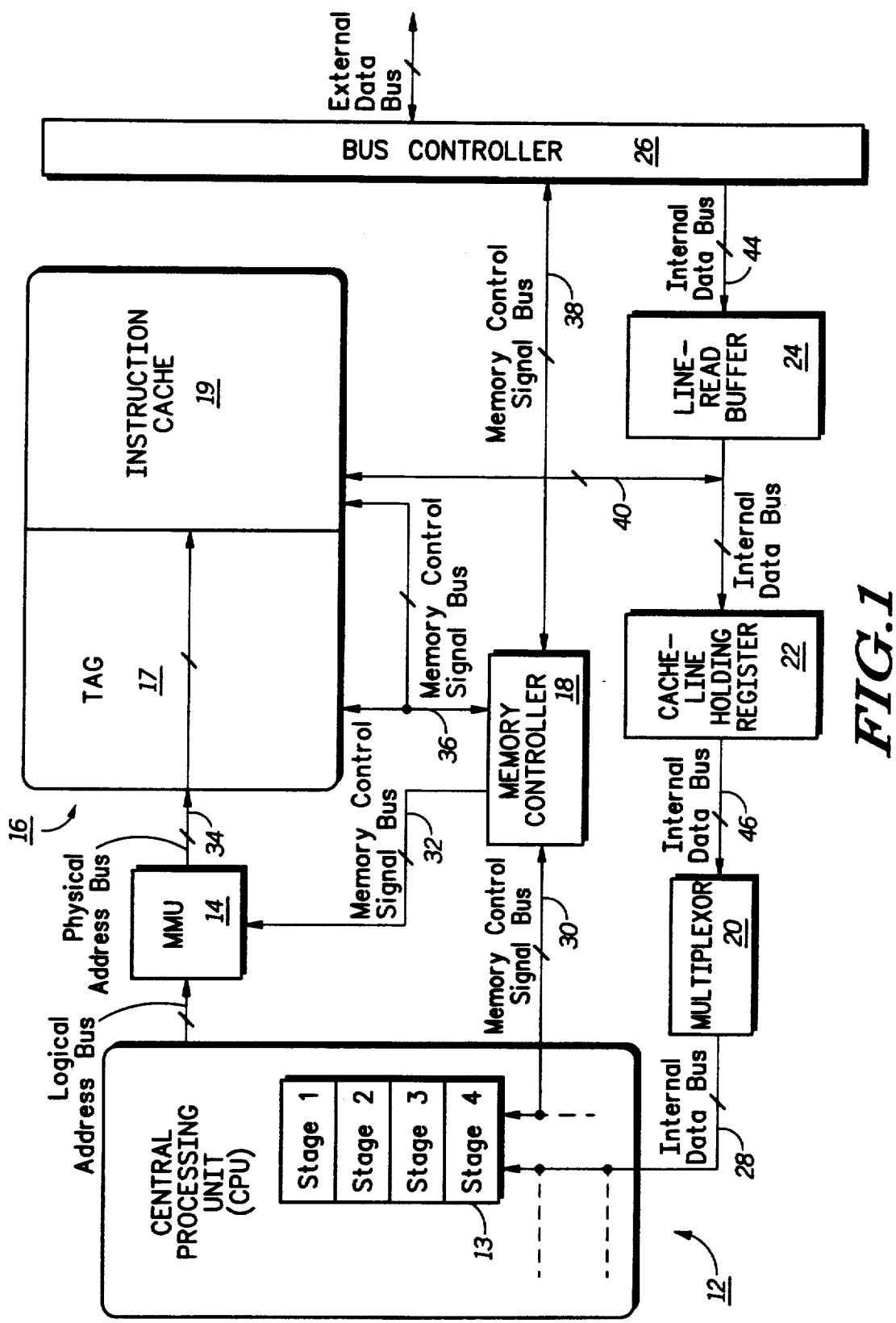
FIG. 1 illustrates in block diagram form a data processing system with an on-chip set associative instruction cache in accordance with the present invention.

FIG. 1 illustrates a data processing system with an on-chip set associative instruction cache containing a central processing unit (CPU) 12, a memory management unit (MMU) 14, a cache-tag portion 16, a memory controller 18, a multiplexor 20, a cache-line holding register 22, a line-read buffer 24, and a bus controller 26. The CPU 12 contains an instruction pipe stage portion 13, and the cache-tag portion 16 has a tag 17 and an instruction cache 19. Further, the instruction pipe stage portion 13 is divided into a predetermined number of stages such as Stages 1-4. Each of the Stages 1-4 contains an instruction decoder (not illustrated).

The CPU 12 has an output for providing logical addresses to an address input of MMU 14 via a logical address bus, a data input for receiving data from an output of multiplexor 20 via an internal data bus 28, and a control Input/Output (I/O) connected to a first I/O terminal of memory controller 18 for receiving and providing control signals via a memory control signal bus 30. The data input and the control I/O are connected to the instruction pipe stage portion 13 as well as other portions of the CPU (not illustrated). The MMU 14 has a control input connected to a control output of memory controller 18 via a memory control signal bus 32 and has an address output connected to an input of cache-tag portion 16 via physical address bus 34. The memory controller 18 has a second I/O terminal connected to a first I/O terminal of both the tag and instruction cache of the cache-tag portion 16 via a memory control signal bus 36. The memory controller 18 has a third I/O terminal connected to a first I/O terminal of bus controller 26 via a memory control signal bus 38. The instruction cache 19 of cache-tag portion 16 has a second I/O terminal connected to both an input of the cache-line holding register 22 and an output of the line-read buffer 24 via an internal data bus 40. The line-read buffer 24 has an input connected to an output of bus controller 26 via an internal data bus 44. The multiplexor 20 has an input connected to an output of the cache-line holding register 22 via internal data bus 46. The bus controller 26 has a second I/O terminal connected to an external data bus.

Figure 2:
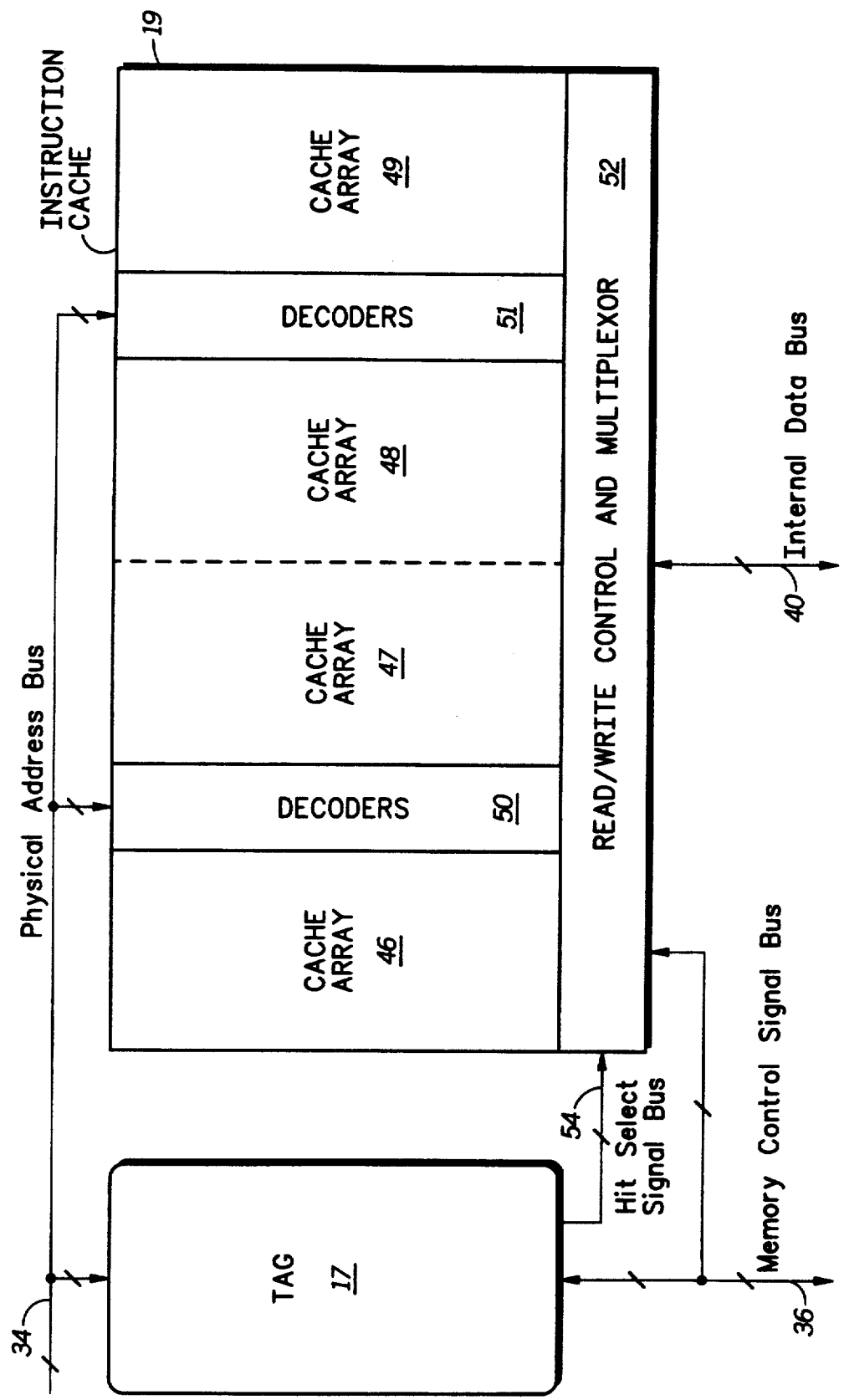
FIG. 2 illustrates in block diagram form the set associative instruction cache of the system of FIG. 1.

FIG. 2 illustrates the cache-tag portion 16 in more detail. The instruction cache 19 has a plurality of cache arrays 46-49, decoders 50-51, and a read/write control and multiplexor 52. FIG. 2 also illustrates that the memory control signal bus 36, and the internal data bus 40 are each connected to the read/write control and multiplexor 52 of the instruction cache 19. The tag 17 has a control output connected to an input of the read/write control and multiplexor 52 via a hit-select signal bus 54. The tag 17 contains a predetermined number of tag-addresses, and the instruction cache contains a predetermined number of cache-addresses. Furthermore, each tag-address within tag 17 corresponds to a predetermined cache-address within instruction cache 19.

In operation, the CPU 12 of FIG. 1 begins a read access operation of cache 19 by providing a logical address to the MMU 14. In response to both memory control signals from memory controller 18 and the logical address from CPU 12, MMU 14 provides a physical address to the cache-tag portion 16. Referring to FIG. 2, a predetermined number of physical addresses from the physical address bus 34 is compared with the tag-addresses within tag 17. If the physical address from physical addresses bus 34 matches a tag-address within tag 17, a predetermined one of the hit-select signals, within hit-select signal bus 54, will be activated. Otherwise, all of the hit-select signals remain inactive. Also, decoders 50 and 51 each decode a predetermined portion of the physical address provided by physical address bus 34. In response to the decode information provided by decoders 50 and 51, cache arrays 46-49 provide a selected row of cache data information to the read/write control and multiplexor 52. In response to control information within both the hit select signal bus 54 and the memory control signal bus 36, the read/write control and multiplexor 52 connects either a buffered version of the selected row of cache data information from cache arrays 46-49 to the internal data bus 40 for a read operation or a buffered version of the internal data bus 40 to the selected row of cache data information from cache arrays 46-49 for a write operation. The read/write control and multiplexor 52 functions as a multiplexor to select a portion of address information within each of the cache arrays 46-49 in response to the signals within the hit select signal bus 54.

For the read operation of cache 19, the buffered data provided by the read/write control and multiplexor 52 is latched into the cache-line holding register 22 of FIG. 1 at a predetermined time. Subsequently, multiplexor 20 transfers a predetermined multiplexed portion of the latched data within the cache-line holding register 22 to the CPU 12.

For a write operation of instruction cache 19, bus controller 26 of FIG. 1 transfers cache data from the external data bus to the line-read buffer 24 via internal data bus 44 in response to the memory controller 18. The line-read buffer 24 transfers the cache data to the CPU 12 via the cache-line holding register 22 and multiplexor 20 as discussed above. Subsequently, the line-read buffer 24 transfers the cache data to the cache-tag portion 16. In response to memory controller 18 and the physical address from MMU 14, the cache data is stored in a predetermined memory location within the instruction cache 19.

A problem common to large cache arrays, and in particular to large set associative cache arrays utilized with a data processor is excessive power consumption. The data processing system of FIG. 1 with an on-chip set associative instruction cache operates in a manner that significantly reduces the problem of excessive power consumption. That is, a decoded signal from an output of a decoder (not illustrated) within a predetermined intermediate stage of the instruction pipe stage portion 13 instructs the memory controller 18 on how much information to access from the instruction cache 19.

In more detail, a large set associative cache has output information represented as a large number of bits called a "line." The line of output information typically contains instruction information for one or more instructions. Furthermore, the instruction information for one instruction is generally contained within only a portion of the line. The CPU 12 and memory controller 18 of FIG. 1 take advantage of the fact that the information needed from the instruction cache 19 is generally available from a portion of the line by accessing only a predetermined portion of the instruction cache 19. By accessing only a portion of the instruction cache 19 per instruction, a substantial savings in power consumption is realized. However, there are some instructions, such as a "Branch" instruction that generally require additional information for a complete execution. Further, the additional information required for a complete execution is generally contained within the entire output line of the instruction cache 19. When an instruction that requires additional information for a complete execution, such as a Branch instruction, is decoded within the instruction pipe stage portion 13, the memory controller 18 conditions the instruction cache 19 for an access of the entire output line. The detection of an instruction that requires subsequent information for complete execution can be determined by decoding a predetermined portion of the op-code (not illustrated) of a queued instruction within the instruction pipe stage portion 13. For example, assume that the op-code of the instruction that is currently executing within the CPU 12 has been fully decoded and resides in Stage 1 of the instruction pipe stage portion 13. The op-code for the subsequent instruction to be executed is partially decoded and resides in Stage 2, an intermediate stage, of the instruction pipe stage portion 13. When the op-code for an instruction that requires additional information for completion, such as a Branch instruction, resides in Stage 2 of the instruction pipe stage portion 13, a partial decode of the op-code will signal the memory controller 18 that an entire output line of information from the instruction cache 19 is required. When the current instruction completes execution, the op-code resident in Stage 2, that was partially decoded, is transferred to Stage 1 of the instruction pipe stage portion 13 for execution. When the new instruction is executed and accesses the instruction cache 19, an entire output line of information is provided by the instruction cache 19 instead of only a portion of the output line. The entire output line of information is subsequently latched into the cache-line holding register 22, as described above, and selected portions of the output line information are provided to the CPU 12 via multiplexor 20. By accessing an entire output line of information from the instruction cache 19 when required, op-code execution performance of the data processor is maintained.

It should be well understood that a data processor having an instruction varied set associative cache boundary accessing provides reduced power consumption for a set associative cache. Further, by providing a decoding of a subsequent instruction within an instruction pipe to detect instructions that require additional information to execute to completion, the op-code execution performance of a data processor is maintained.

By now it should be apparent that although an instruction pipe containing four stages is illustrated, any number of stages may be utilized. Although a four-way set associative instruction cache is illustrated, any number of sets may be utilized. Also, although the illustrated set associative cache is a set associative instruction cache, the present invention is also applicable to a set associative data cache.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

I claim:

1. A data processor having instruction varied set associative cache boundary accessing, comprising:
   instruction processing and decoding means for receiving a plurality of successive instructions and decoding the successive instructions, the instruction decoding means providing a set associative cache boundary control signal for a subsequent set associative cache access;
   set associative cache control means having an input coupled to the instruction processing and decoding means for receiving the set associative cache boundary control signal and providing an encoded enable signal;
   a set associative cache coupled to set associative cache control means for receiving the encoded enable signal and having a predetermined number of lines of information of predetermined bit length, said set associative cache using the encoded enable signal to dynamically select one of a plurality of predetermined lengths of a line of information to be accessed in the set associative cache and provided by the set associative cache, the set associative cache normally providing only one-half line of information in response to the encoded enable signal in order to conserve power in the data processor and providing a full line of information only in response to the data processor requiring the complete line of information;
   a holding register having an input coupled to the set associative cache and having an output, the holding register storing information from the set associative cache; and
   a multiplecor having an input coupled to the output of the holding register, and having an output coupled to the instruction processing and decoding means for providing a selected portion of information provided by the set associative cache.

2. The data processor of claim 1 further comprising: a communications bus coupled between the instruction processing and decoding means and the set associative cache and having a predetermined bit width of more bits than one or more of the lengths in the plurality of predetermined lengths.

3. The data processor of claim 1 wherein the set associative cache is a four-way set associative cache.

4. The data processor of claim 1 wherein the set associative cache is one of an instruction cache or a data cache.

5. In a data processing system having a set associative cache, a method for varying a boundary within a line of information accessed, comprising the steps of:
   receiving a plurality of successive instructions and decoding the successive instructions with a central processing unit of the data processing system;
   for each decoding of the successive instructions, providing a set associative cache boundary control signal for a subsequent set associative cache access;
   providing an encoded enable signal in response to each set associative cache boundary control signal; and
   accessing a set associative cache having a predetermined number of lines of information of predetermined bit length and using the encoded enable signal to dynamically select a length of a line of information to be accessed in the set associative cache and provided by the set associative cache, the selected length normally being one-half of the line of information to conserve power in the data processing system and being a complete line of information only in response to the data processing system requiring the complete line of information;
   storing the selected length of the line of information in a holding register circuit; and
   multiplexing a portion of the stored selected length of the line of information by transferring a predetermined portion of the stored selected length of the line of information to the central processing unit.

* * * * *